(12) United States Patent
Yoon et al.

(10) Patent No.: US 10,958,421 B2
(45) Date of Patent: Mar. 23, 2021

(54) USER ACCESS CONTROL IN BLOCKCHAIN (71) Applicant: INTERNATIONAL BUSINESS MACHINES CORPORATION, Armonk, NY (US)

(72) Inventors: Woong A. Yoon, Boxborough, MA (US); Daniel Dulaney, Groton, MA (US); John P Filippone, Cambridge, MA (US); Bonnie Ishiguro, San Jose, CA (US); Alex X Casella, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 16/196,405

(22) Filed: Nov. 20, 2018

(65) Prior Publication Data
US 2020/0162238 A1 May 21, 2020

(51) Int. Cl.
*H04L 9/06* (2006.01)
*G06F 16/27* (2019.01)
(Continued)

(52) U.S. Cl.
CPC ............ *H04L 9/0637* (2013.01); *G06F 16/27* (2019.01); *G06F 21/602* (2013.01); *H04L 9/0819* (2013.01); *H04L 2209/38* (2013.01)

(58) Field of Classification Search
CPC . H04L 9/0637; H04L 9/0819; H04L 2209/38; H04L 63/00; H04L 9/3239;
(Continued)

(56) References Cited

U.S. PATENT DOCUMENTS

| 8,832,466 B1* | 9/2014 | McGregor, Jr. ....... H04L 9/0618 713/193 |
| 2011/0150224 A1* | 6/2011 | Noh ..................... H04L 9/0836 380/277 |

(Continued)

FOREIGN PATENT DOCUMENTS

| GB | 2540977 A | 2/2017 |
| WO | 2018019364 A1 | 2/2018 |

(Continued)

OTHER PUBLICATIONS

Wong et al., "Secure group communications using key graphs", IEEE/ACM Transactions on Networking, vol. 8, No. 1, Feb. 2000, pp. 16-30.

(Continued)

*Primary Examiner* — Ashokkumar B Patel
*Assistant Examiner* — Quazi Farooqui
(74) *Attorney, Agent, or Firm* — L. Jeffrey Kelly (57) ABSTRACT

A method, computer system, and a computer program product for controlling access to an asset in a blockchain network is provided. The present invention may include encrypting the asset using a target encryption key. The present invention may also include storing the encrypted asset on a ledger. The present invention may then include receiving a start encryption key to access the asset. The present invention may further include traversing a graph of keys beginning with the start encryption key across a plurality of nodes and edges until reaching the target encryption key. The present invention may also include allowing access to the asset based on reaching the target encryption key.

20 Claims, 6 Drawing Sheets

(51) Int. Cl.
*G06F 21/60* (2013.01)
*H04L 9/08* (2006.01)

(58) Field of Classification Search
CPC . H04L 9/088; H04L 9/06; G06F 16/27; G06F 21/602; G06F 16/9024; G06F 21/64; G06F 21/6218
See application file for complete search history.

(56) References Cited

U.S. PATENT DOCUMENTS

| | | | |
|---|---|---|---|
| 2012/0144210 A1* | 6/2012 | Yacobi | H04L 9/3073 |
| | | | 713/193 |
| 2017/0116693 A1 | 4/2017 | Rae et al. | |
| 2017/0177898 A1 | 6/2017 | Dillenberger | |
| 2019/0089537 A1* | 3/2019 | Gray | H04L 63/06 |
| 2019/0372786 A1* | 12/2019 | Ra | G06F 21/30 |

FOREIGN PATENT DOCUMENTS

| | | |
|---|---|---|
| WO | 2018020373 A1 | 2/2018 |
| WO | 2018020377 A1 | 2/2018 |
| WO | 2018039722 A1 | 3/2018 |

OTHER PUBLICATIONS

Mell et al., "The NIST Definition of Cloud Computing", National Institute of Standards and Technology, Special Publication 800-145, Sep. 2011, pp. 1-7.

\* cited by examiner

USER ACCESS CONTROL IN BLOCKCHAIN

BACKGROUND

The present invention relates generally to the field of computing, and more particularly to data accessibility. In a blockchain network, the ledger is typically shared by all participants in the network. The blockchain data is immutable. However, the database that stores the ledger data may be available to the shared participants. Data protection may be sought in a blockchain environment.

SUMMARY

Embodiments of the present invention disclose a method, computer system, and a computer program product for controlling access to an asset in a blockchain network. The present invention may include encrypting the asset using a target encryption key. The present invention may also include storing the encrypted asset on a ledger. The present invention may then include receiving a start encryption key to access the asset. The present invention may further include traversing a graph of keys beginning with the start encryption key across a plurality of nodes and edges until reaching the target encryption key. The present invention may also include allowing access to the asset based on reaching the target encryption key.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

The following described exemplary embodiments provide a system, method and program product for user access control in blockchain. As such, the present embodiment has the capacity to improve the technical field of blockchain by encrypting sensitive data stored on a blockchain ledger to allow access to the sensitive data to permissioned users (i.e., users, requesters or participants). More specifically, securely storing data (i.e., an asset) on a shared ledger may include granting access to a participant using a graph-based access control model for a blockchain network by sharing an encryption/decryption key relationship in a directed graph data structure.

Blockchain technology may include a shared log of transactions (i.e., records or events) that are kept in blocks of data that may be passed to the next transaction in a linear order. A block may contain the data of one or more records or transactions. A block may hold the data before the block has been completed, prior to consensus and prior to being transferred to the next block in a blockchain, for example, a transaction pool, a memory pool or a candidate block. A block may also be a block of one or more records or transactions attached to a blockchain, for example, a transaction that has been permanently appended and recorded to the files in a ledger.

With blockchain technology, when a transaction is written into a ledger, there may be a mechanism to make sure all the records are synchronized and if the network system detects an error, the error may be immediately corrected. Blockchain systems are immutable since a hash value on each block may be created and any change in data will show a different hash value. Each block may contain the hash of the previous block and the current transactions before the next hash may be created. After consensus is reached, then the data may be verified. Each block may have a hash value of the previous block in the chain and there may be no way to modify the data in the previous block. If the data is modified, the modified data may be detected by a re-calculated hash value. A different hash value may show that the network system has been compromised.

As previously described, in a blockchain network, the ledger is typically shared by all participants in the network. A shared ledger may allow the participants to access the data stored in the database. Although the blockchain data is immutable, the state database that stores the ledger may be available to the shared participants. Data protection may be sought in a blockchain environment.

The ledger may, for example, be made up of the blockchain and a state database. Each transaction added to the ledger may change the state of the data in the blockchain network. The ledger may independently be updated by each user. Since participants (i.e., users) or a participant group (i.e., a user group) in a blockchain network may have access to the ledger data stored in the ledger, a challenge may be presented when attempting to protect an asset from the user group. An asset may include, for example, sensitive data, sensitive personal information (SPI) or protected health information (PHI).

One challenge related to a blockchain network may include how to control and allow access to sensitive data stored in the ledger to permissioned users only in a user group. Therefore, it may be advantageous to, among other things, provide data access control by encrypting sensitive data when the sensitive data is saved to the a blockchain ledger and provide a mechanism to share decryption keys that may be accessed by permissioned users only.

Some current access control frameworks may consist of defining which participant has access to an asset and allowing the participant direct access to the asset. In many cases, defining which participant has access control to the asset and the actual implementation of the participant access control to the asset are independent steps. Verifying participant access may include a simple table lookup of a record and may not manage actual access. For example, even if a table identifies that a user has access to an asset, the identification does not necessarily validate if the user has actual access to the asset since the actual implementation is independent of the access record or table.

According to at least one embodiment, a graph-based access control (GBAC) model for a blockchain network may provide a unified and efficient way to check user permissions such that the representation of access control and the implementation of access control are part of the same process. Verification of user access may represent how the access is controlled. For example, access verification to an asset may be implemented by finding a path from the user key access to multiple other key paths. A shared ledger may, for example, manage the sharing of the encryption/decryption keys relationships in the directed graph data structure.

According to the present embodiment, a graph of an encryption and decryption relationship of keys may manage data access control. Cryptographic keys may be assigned to many entities (i.e., users, organizations and assets). To efficiently control access to the encrypted data, a graph structure in the ledger may be created by keys that may decrypt other keys until the decryptable asset is reached.

The present embodiment may be used in many industries, such as medical, business, finance, law, government or agriculture. The medical industry may be used for example purposes. Users or participants may include, for example, a group of patients, doctors, hospital administrators, nurses or other medical industry professionals and each may be identified in a hospital network. Each user may have a private key and a public key (i.e., private and public key pairs). Assets in the medical industry may include, for example, the PHI of a patient, such as x-ray image results, blood test results, a medical diagnosis, treatment for a disease or lab test results. Assets in a finance industry may include, for example, sensitive client data such as individual or business financial statements, tax documents or confidential internal memoranda.

An asset may be a piece of data. An asset may be encrypted with keys (e.g., symmetric keys) and may be stored on the shared ledger (i.e., blockchain and state database). A symmetric algorithm, such as advanced encryption standard (AES) 256 may be used to encrypt the asset with symmetric keys.

Access to each asset may be controlled by sharing the symmetric key of the asset. The asset may be encrypted and stored on the ledger. A user may not have access to the asset unless the user is provided with the symmetric key that was used to encrypt the asset. Therefore, to grant access to a user, the symmetric key may be given to the user either directly or indirectly. Direct access may be given by encrypting the asset's symmetric key with the user's public key. Indirect access may be given by encrypting the asset's symmetric key with a symmetric key that the user may already have access to.

In addition to storing encrypted keys to the ledger, some data structure is retained to keep track of the relationships between the keys. The relationships may be kept in an access control list. An access control list may include an encryption and decryption key relationship. For example, keys may be encrypted by other keys, creating edges in a graph that may be stored on the ledger. The entries of the list may form a graph structure when the nodes are represented by keys and the edges are represented by the relationship between any key and a key that has encrypted the asset. The encrypted version of the key may be stored in the data structure.

Merging access control to the asset and the actual implementation of the participant access control may be accomplished by verifying access to an asset by traversing a graph of keys beginning with a key that belongs to a user or a key that the user provides to access the asset. To verify access to a key in the graph, the graph may be traversed starting at any key as the start key until a particular target key is found. The graph structure is used to traverse the relationships between keys until a path is found from the start key to the target key. If a path exists between the keys in the graph, then the user may access the asset.

The process for accessing the asset may be the same as the process for verifying access to the asset. Traversing the same graph to obtain an encryption key of the asset and then using the encryption key to decrypt the asset. A determination may be made regarding user access to the asset by finding a path between the user keys in the graph.

For example, the keys of a patient attempting to access the results of the patient x-ray images (i.e., the asset) may be identified as follows.

| | |
|---|---|
| myKey | Private key of the patient that identifies the patient. |
| key2 | Symmetric key of the patient that is an encryption key assigned to the patient. |
| key3 | Enrollment key (symmetric key) for a lab service. The patient gets access to the enrollment key when the patient is enrolled in the service. |
| key4 | Symmetric key that encrypts the x-ray image for the patient. |

The user may access the asset by myKey decrypting key2, then key2 decrypting key3, key3 decrypting key4 and then key4 decrypts the asset.

Figure 1:
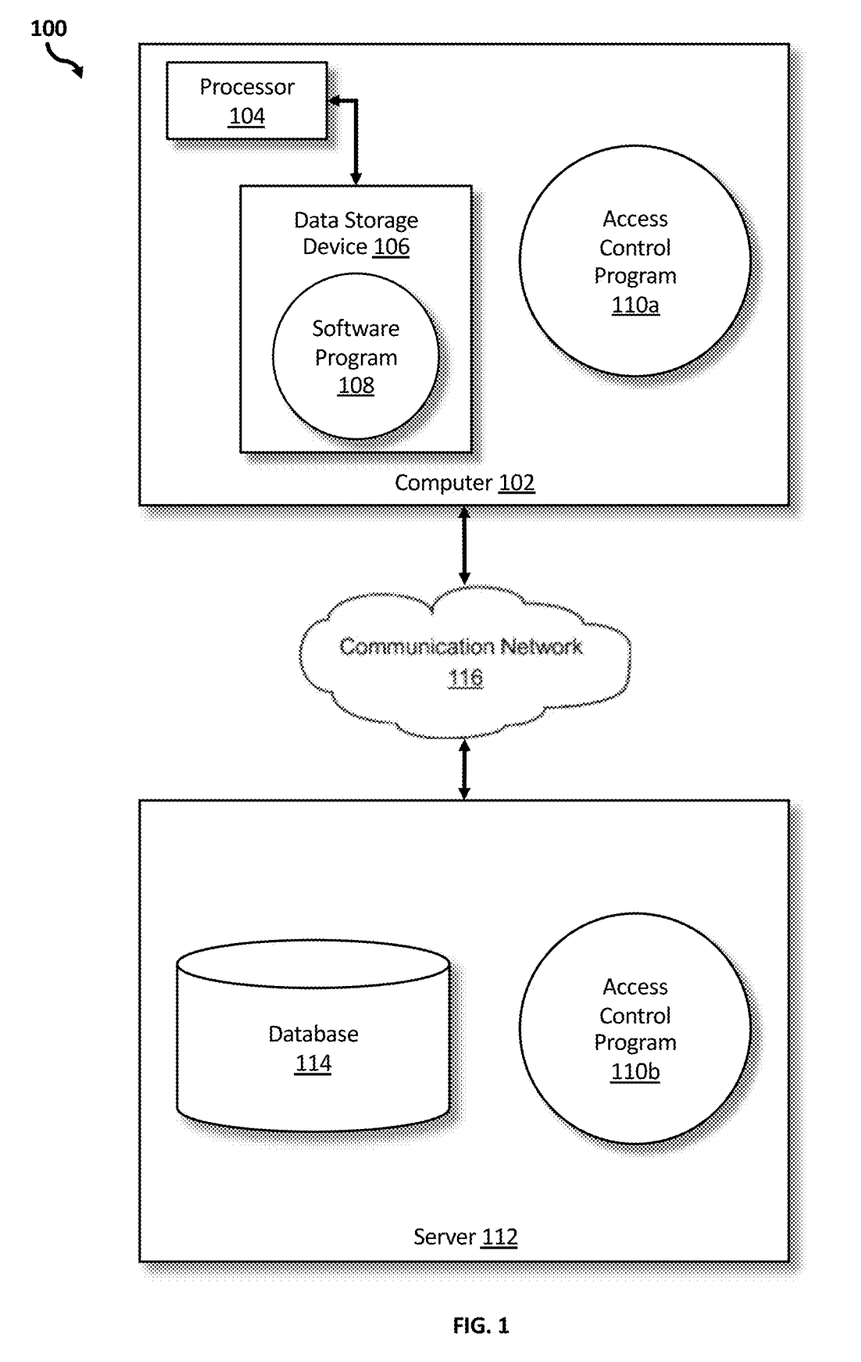
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an access control program 110a. The networked computer environment 100 may also include a server 112 that is enabled to run an access control program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the access control program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the access control program 110a, 110b (respectively) to control access to an asset within a blockchain environment. The access control method is explained in more detail below with respect to FIGS. 2 and 3.

Figure 2:
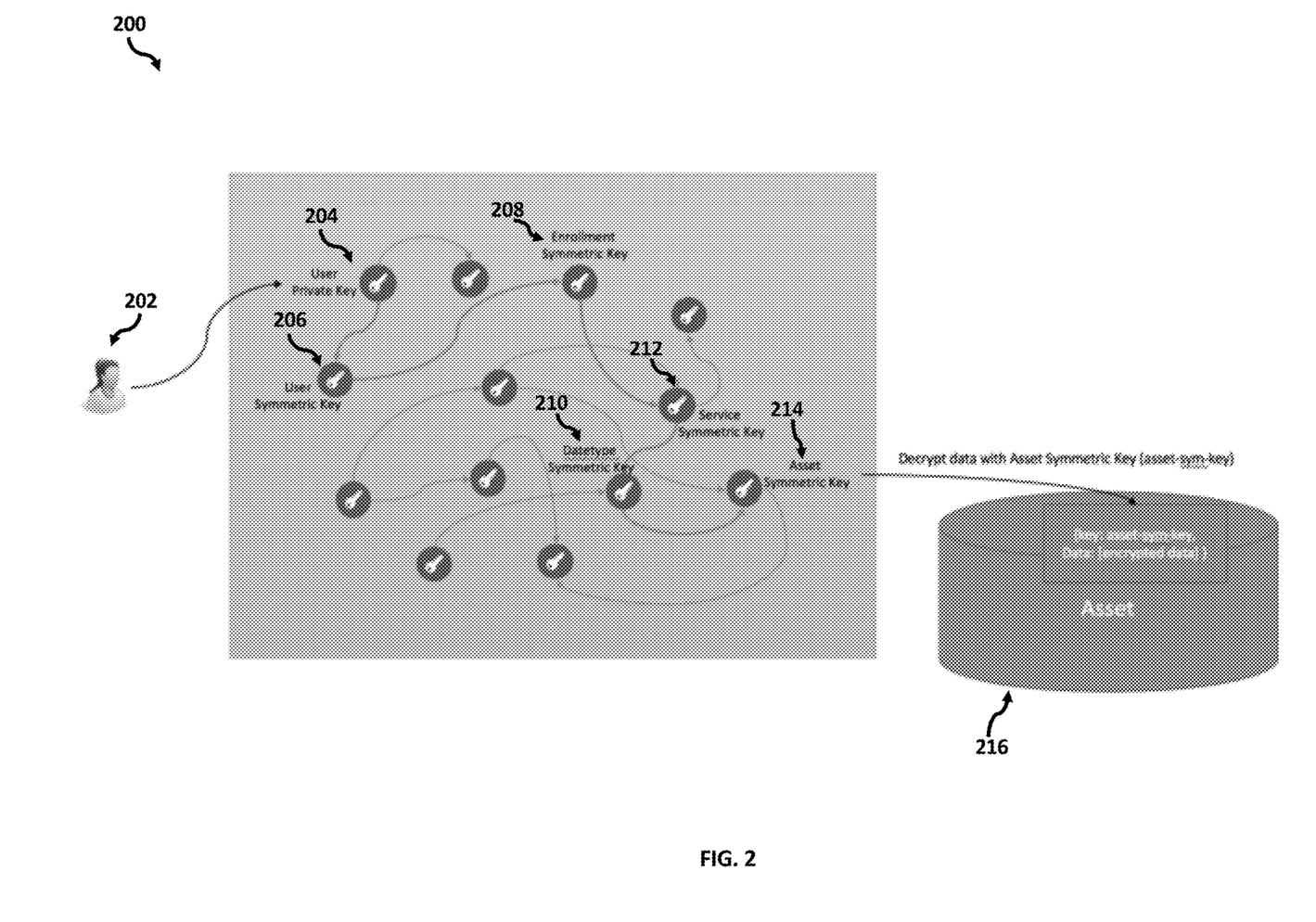
FIG. 2 is a block diagram of an example access control system with a graphical representation of encryption and decryption key relationships according to at least one embodiment.

Referring now to FIG. 2, a block diagram illustrating the exemplary example access control system 200 with a graphical representation of encryption and decryption key relationships used by the access control program 110a, 110b according to at least one embodiment is depicted.

A user 202 may be attempting to access an asset 216 stored on a shared ledger (i.e., blockchain and state database). The blockchain network may represent, for example, a hospital network. Each user 202 or user group in the hospital network may have a key system attribute (KSA) private and public key pairs and a symmetric key. The user 202 key may be encrypted with the symmetric key of the user 202. Encryption and decryption key relationships may be represented by a graph and determining the user permission to the data may find a path in the graph to get the user 202 accessibility to the asset if the proper encryption and decryption keys are used.

A graph may include a data structure composed of nodes and edges. The data structure may include keys as the nodes of the graph and the encryption relationships may include the edges of the graph. The example access control system 200 depicts the nodes and edges of the graph. The circles with the keys (e.g., user symmetric key 206 and user private key 204) may represent the nodes and the arrows connecting the nodes may represent the edges. If one key (e.g., user symmetric key 206) is encrypted by another key (e.g., user private key 204), then an edge is added to the graph between the two keys.

Various keys may be used, such as public keys, private keys or symmetric keys. Public and private key pairs may be used to identify a user 202 (e.g., a patient, a doctor or an administrator) or an organizational unit (e.g., a hospital network). Public and private key pairs may be used as a mechanism for giving a user or an organization access to an asset by encrypting the asset key with the pubic key.

A user private key 204 is a key that may be used to identify the user 202 and the user private key 204 may be permanently assigned to the user 202. The user private key 204 may be implemented as, for example, a Rivest-Shamir-Adleman (RSA) private key, however, the specific algorithm may not be of any consequence if the RSA private key is part of a public/private key pair and if the data encrypted with the public key may only be decrypted using a private key.

A user symmetric key 206 is a key that may be permanently assigned to a user 202 in the system and may be implemented by any key length if the key length matches the key length required by the symmetric encryption algorithm used in the system.

An enrollment symmetric key 208 is a symmetric key may be generated when a patient (e.g., user 202) enrolls into a service, for example, to receive clinical lab test results from a hospital. The enrollment symmetric key 208 may be used to encrypt data that may be shared between the patient and the service administrators (e.g., hospital administrators). To achieve accessibility to the encrypted data, the enrollment symmetric key 208 may be encrypted with the user public key and with the service public key to allow both approved parties access to the data.

A datatype symmetric key 210 is a symmetric key that may be used to encrypt the asset symmetric keys of many assets of a similar type. This may be useful if access is given to many assets of the same type at one time by providing access to the datatype symmetric key 210.

An asset symmetric key 214 is a symmetric key that may be used to encrypt the asset. Each asset may have one asset key and the same asset key may also be used to encrypt many assets.

The asset 216 may include sensitive data, such as patient PHI stored on a ledger. Assets 216 may be encrypted with an advanced encryption standard (AES) symmetric key that is stored on the state database (i.e., data stored on the ledger) as {keyId: "asset-key-id",
data: [encrypted data bytes]}.

Symmetric keys may be shared with permissioned users.

Figure 3:
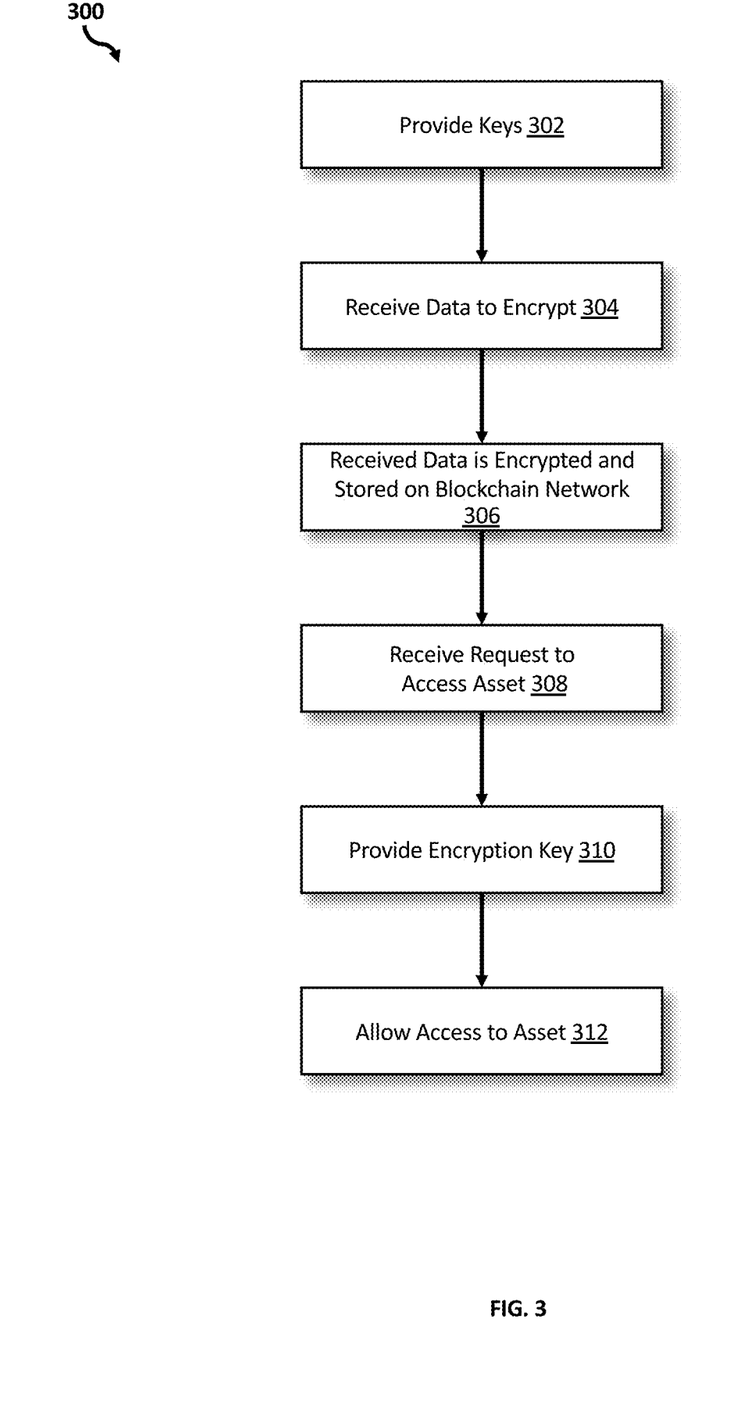
FIG. 3 is an operational flowchart illustrating a process for access control using blockchain according to at least one embodiment.

Referring now to FIG. 3, an operational flowchart illustrating the exemplary access control using blockchain process 300 used by the access control program 110a, 110b according to at least one embodiment is depicted.

At 302, keys are provided. The keys may be generated randomly as needed. Once the keys are generated, the keys may not be changed. A key may be provided and stored for use to encrypt data that may be received currently or received at a later point in time. Providing keys ahead of time may allow, for example, the asset to be encrypted and protected in the interim before a user attempts to access the asset.

Then, at 304, data to encrypt is received. Data (i.e., the asset) may be provided by, for example, a medical lab testing company using a computing device (e.g., computer 102) to send the confidential patient data to the hospital network to be transmitted to the access control program 110a, 110b. For example, the asset may be received by the hospital over a communication network 116 by a representational state transfer (REST) application program interface (API). The transmitted asset may include sensitive data such as medical test results or PHI from a lab to a hospital for a doctor and then a patient to review. Additionally, as an example, the PHI may be internally transmitted from one hospital department to a different hospital department in the same network or from a different network.

At 306, the received data is encrypted and stored on a blockchain network. The encryption key may be used to encrypt the received asset and the encrypted received asset may then be stored on the ledger (i.e., blockchain and state database). The asset may be encrypted, for example, by using the asset symmetric key. The key information may also be stored on the ledger.

For example, the encrypted asset is stored on a state database and the encryption key is encrypted with a key that belongs to the asset owner. The encryption key may then be stored to the state database. The graph may now have an edge created between a first node (i.e., an encryption key) and a second node (i.e., a key belonging to the asset owner). If the asset owner would like to access the asset at a later point in time, the asset owner may verify access to the asset by traversing the key graph starting with the asset owner key and ending at an asset encryption key.

At 308, a request to access the asset is received. The request may be made, for example, through a REST API call. A request may be triggered by a user in a blockchain network requesting access to the stored and encrypted asset. For example, a patient would like to view the medical lab results that were transmitted to the hospital and the patient enrolls into the hospital network for access to the lab results. The enrolling process may, for example, require the patient to provide data to the hospital network to obtain access, such as, the patient logging into the hospital network and providing personal data to identify the patient. Personal data may include a name, a residential address, a medical insurance identification number, a patient number, a social security number and an email address.

At 310, an encryption key is provided. An encryption key to the asset may be provided after the user has been allowed access. For example, once the patient enters the required personal data to receive access to the asset, a user private key 204 is provided to the patient. The user private key 204 may be used as a start key and the requested asset symmetric key 214 may be used as the target key. A graph traversal may be performed to find a path between the start key and the target key. Once the path is identified, each key on the path may be used to decrypt the next key until the target key has been decrypted successfully.

Verifying access and accessing an asset may operate with the same data structure used to identify a path and to access the asset. For example, the keys used to decrypt the next key in the path may be the same keys that make up the nodes of the graph data structure, creating the same mechanism to verify access as to provide access to the asset.

Then, at 312, access to the asset is allowed. The encryption key may be used to decrypt the asset and the asset may be returned to the requester (i.e. the user). Continuing from the previous example, the patient may now have the ability to view the medical test results.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
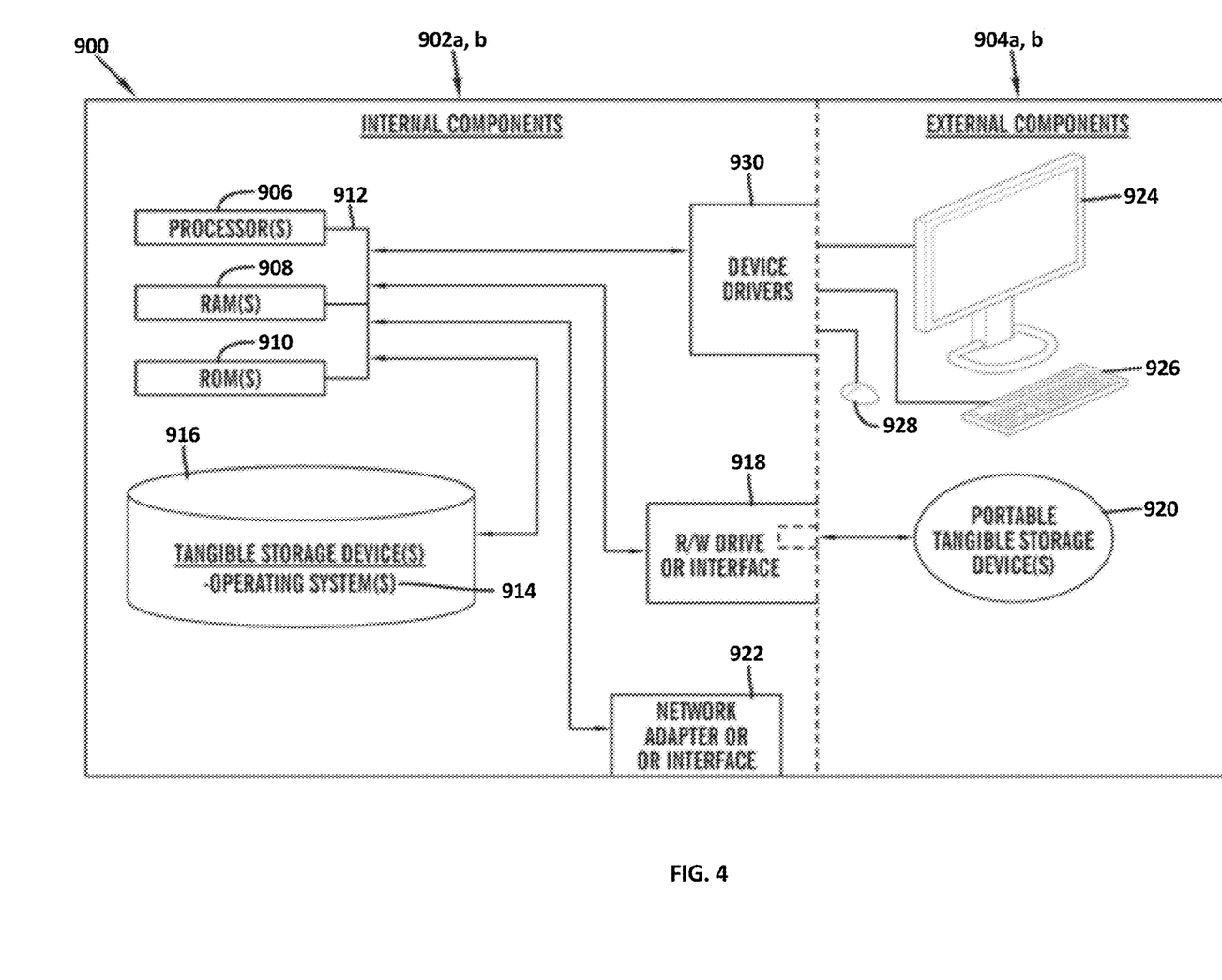
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the access control program 110a in client computer 102, and the access control program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the access control program 110a, 110b can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the access control program 110a in client computer 102 and the access control program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the access control program 110a in client computer 102 and the access control program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
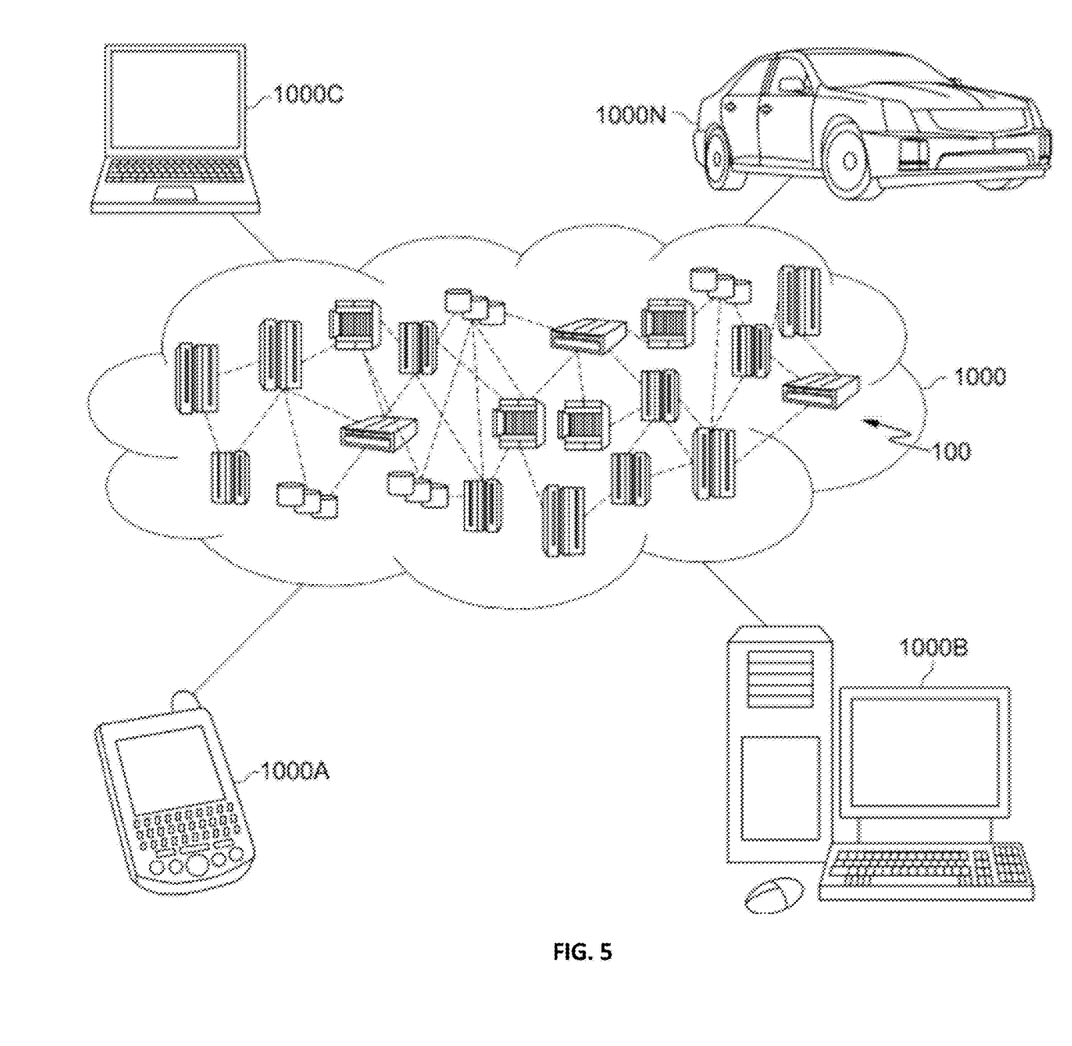
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
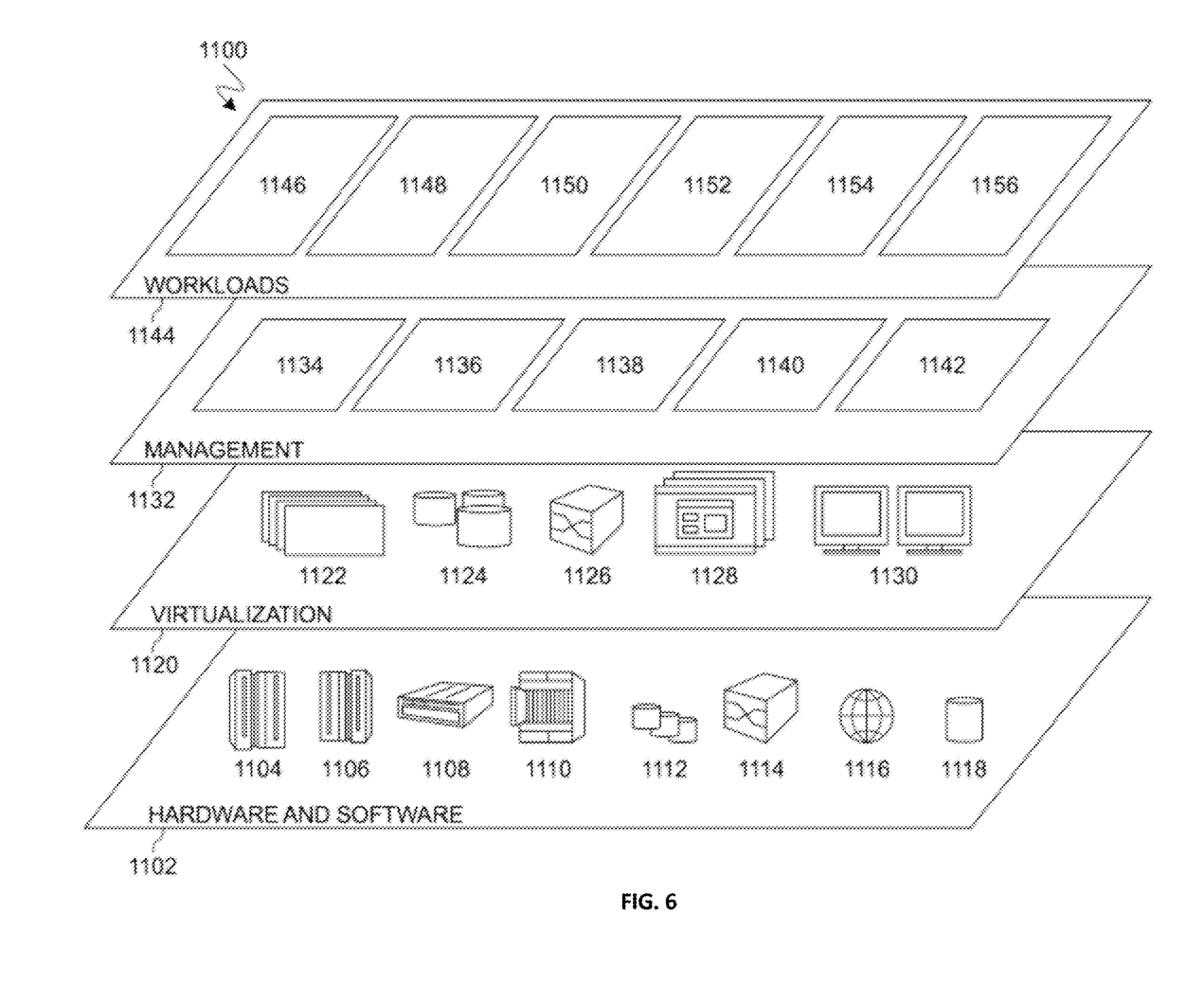
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and asset access control in a blockchain environment 1156. An access control program 110a, 110b provides a way to graphically create encryption and decryption relationships with keys to manage access control of a ledger.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling access to an asset in a blockchain network, the method comprising:
   encrypting the asset using a target encryption key;
   storing the encrypted asset on a ledger;
   receiving a start encryption key;
   creating an edge between a first node and a second node, wherein the first node is the target encryption key and the second node is the start encryption key;
   receiving a request to access the asset;
   traversing a graph of keys beginning with the start encryption key across a plurality of nodes and edges until reaching the target encryption key, wherein the nodes represent the keys and the edges represent encryption relationships;
   providing an encryption key based on reaching the target encryption key; and
   allowing access to the asset.

2. The method of claim 1, wherein the asset is encrypted using an asset symmetric key.

3. The method of claim 1, wherein the ledger is comprised of a blockchain and a state database.

4. The method of claim 1, wherein the request to access is made by a user.

5. The method of claim 1, wherein the asset is sensitive user data.

6. The method of claim 1, wherein the start encryption key is a user private key.

7. The method of claim 1, wherein the accessibility to the asset uses a graph-based access control model.

8. A computer system for controlling access to an asset in a blockchain network, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   encrypting the asset using a target encryption key;
   storing the encrypted asset on a ledger;
   receiving a start encryption key;
   creating an edge between a first node and a second node, wherein the first node is the target encryption key and the second node is the start encryption key;
   receiving a request to access the asset;
   traversing a graph of keys beginning with the start encryption key across a plurality of nodes and edges until reaching the target encryption key, wherein the nodes represent the keys and the edges represent encryption relationships;
   providing an encryption key based on reaching the target encryption key; and
   allowing access to the asset.

9. The computer system of claim 8, wherein the asset is encrypted using an asset symmetric key.

10. The computer system of claim 8, wherein the ledger is comprised of a blockchain and a state database.

11. The computer system of claim 8, wherein the request to access is made by a user.

12. The computer system of claim 8, wherein the asset is sensitive user data.

13. The computer system of claim 8, wherein the start encryption key is a user private key.

14. The computer system of claim 8, wherein the accessibility to the asset uses a graph-based access control model.

15. A computer program product for controlling access to an asset in a blockchain network, comprising:
   a computing device containing one or more non-transitory computer-readable tangible storage media and program instructions stored on at least one of the one or more non-transitory computer-readable tangible storage media, the program instructions executable by a processor to cause the processor to perform a method comprising:

encrypting the asset using a target encryption key;

storing the encrypted asset on a ledger;

receiving a start encryption key;

creating an edge between a first node and a second node, wherein the first node is the target encryption key and the second node is the start encryption key;

receiving a request to access the asset;

traversing a graph of keys beginning with the start encryption key across a plurality of nodes and edges until reaching the target encryption key, wherein the nodes represent the keys and the edges represent encryption relationships;

providing an encryption key based on reaching the target encryption key; and allowing access to the asset.

16. The computer program product of claim 15, wherein the asset is encrypted using an asset symmetric key.

17. The computer program product of claim 15, wherein the ledger is comprised of a blockchain and a state database.

18. The computer program product of claim 15, wherein the request to access is made by a user.

19. The computer program product of claim 15, wherein the asset is sensitive user data.

20. The computer program product of claim 15, wherein the start encryption key is a user private key.

* * * * *